United States Patent [19]
Spry

[11] Patent Number: 5,596,319
[45] Date of Patent: Jan. 21, 1997

[54] VEHICLE REMOTE CONTROL SYSTEM

[76] Inventor: Willie L. Spry, 802 N. Carew Dr., Placentia, Calif. 92870

[21] Appl. No.: 332,147

[22] Filed: Oct. 31, 1994

[51] Int. Cl.$^6$ ..................................................... G08G 1/16
[52] U.S. Cl. ........................... 340/903; 180/68.1; 180/167; 348/114; 348/724; 348/726; 434/63; 434/66; 446/456
[58] Field of Search ..................................... 340/903, 438, 340/439; 364/424.04, 424.03, 439, 113, 143, 148; 434/63, 62, 65, 66, 69; 446/456; 180/198, 68.1, 68.2, 167; 273/86 R, 86 B; 901/1; 348/114, 723, 724, 725, 726

[56] References Cited

U.S. PATENT DOCUMENTS

| | | | |
|---|---|---|---|
| 3,875,996 | 4/1975 | Von Kohorn et al. . | |
| 4,334,221 | 6/1982 | Rosenhagen et al. | 180/167 |
| 4,817,948 | 4/1989 | Simonelli . | |
| 4,848,247 | 7/1989 | Kuipers . | |
| 4,855,822 | 8/1989 | Narendra et al. | 348/114 |
| 5,161,021 | 11/1992 | Tsai | 348/725 |
| 5,307,271 | 4/1994 | Everett, Jr. et al. | 180/169 |
| 5,309,140 | 5/1994 | Everett, Jr. et al. . | |

FOREIGN PATENT DOCUMENTS

| | | | |
|---|---|---|---|
| 281427 | 9/1988 | European Pat. Off. . | |
| 0290364 | 11/1988 | France | 434/66 |
| 2039754 | 8/1980 | United Kingdom . | |
| 2128842 | 5/1984 | United Kingdom | 434/63 |

*Primary Examiner*—Nina Tong
*Attorney, Agent, or Firm*—Richard C. Litman

[57] ABSTRACT

A vehicle remote control system includes at least one remote controlled vehicle and a remote control station for each of the at least one remotely controlled vehicles. Each control station allows a user to control the operation of one of the remote control vehicles. Each remote controlled vehicle includes a camera having a lens with a field of view in a direction toward a forward path of travel for that vehicle. In a preferred embodiment, the vehicle is a car and includes various sensors for monitoring the operation of various parameters of the vehicle, such as speed. Each car is equipped with an instrument panel located in the field of view of the lens as well as two side rear view mirrors, one attached to a left fender and the other to a right fender, which are also located in the field of view of the lens. In this manner, the user at a remote control station controlling the vehicle may see on a monitor objects located in front or to the sides of the vehicle, objects behind the vehicle, and may monitor the various parameters displayed on the instrument panel. In the preferred embodiment, the monitor is any commercially available television set. A communications system including two way radios as needed is provided for communications between users, including the race coordinator. A vehicle conditioning platform is used to cool or heat or selectively cool/heat vehicle(s) not being used immediately.

14 Claims, 4 Drawing Sheets

VEHICLE REMOTE CONTROL SYSTEM

BACKGROUND OF THE INVENTION

1. FIELD OF THE INVENTION

The present invention relates to reduced scaled racing systems which include a camera on the racing vehicle to provide a real to life image of the path of travel of the vehicle on a monitor viewed by the user. More particularly, the present invention pertains to those reduced scale racing systems.

2. DESCRIPTION OF THE PRIOR ART

U. S. Pat. No. 4,817,948 issued Apr. 4, 1989 to Louise Simonelli and European Patent Application No. 281,427 published Sep. 7, 1988 for Harold D. Pierce et al. disclose reduced-scale racing systems, wherein each one includes vehicles having inboard cameras and transmitters for transmitting the video image as well as data from various inboard sensors. Each system also includes remote control stations, each station having various user input sensors for the remote control of a vehicle as well as a video display to allow the user to view the path of travel of the vehicle as monitored by its on-board camera.

U.S. Pat. No. 3,875,996 issued Apr. 8, 1975 to Henry Von Kohorn discloses a platform having air-conditioned ducts located therebeneath to cool an object on the platform.

U. S. Pat. No. 4,848,247 issued Jul. 18, 1989 to Sytze A. Kuipers discloses a pallet having holes through its top surface through which air may flow to cool an object resting thereon.

U. S. Pat. No. 5,309,140 issued May 3, 1994 to Hobart R. Everett, Jr., et al. discloses a system for providing an output corresponding to the speed of a remotely controlled vehicle.

United Kingdom Patent Application No. 2,039,754 published Aug. 20, 1980 for Kin Leung discloses a steering mechanism for a remotely controlled vehicle utilizing only on control frequency.

None of the above inventions and patents, taken either singly or in combination, is seen to describe the instant invention as claimed.

SUMMARY OF THE INVENTION

The vehicle remote control system of the present invention includes at least one remote controlled vehicle and a remote control station for each of the at least one remotely controlled vehicles. Each control station allows a user to control the operation of one of the remote control vehicles. Each remote control vehicle includes a camera having a lens with a field of view in a direction toward a forward path of travel for that vehicle. In a preferred embodiment, the vehicle is a car and includes various sensors for monitoring the operation of various parameters of the vehicle, such as speed. Each car is equipped with an instrument panel located in the field of view of the lens as well as two side rear view mirrors, one attached to a left fender and the other to a right fender, which are also located in the field of view of the lens. In this manner, the user at a remote control station controlling the vehicle may see on a monitor objects located in front and to the sides of the vehicle, objects behind the vehicle, and may monitor the various parameters displayed on the instrument panel. In the preferred embodiment, the monitor is any commercially available television set.

Accordingly, it is a principal object of the invention to provide a vehicle remotely controlled from a remote control station with a camera allowing a user to view at least the forward path of travel of the vehicle from the remote controlled station.

It is another object of the invention to utilize any commercially available television set as the monitor.

It is a further object of the invention to provide sensors for the vehicle to monitor various parameters thereof.

Still another object of the invention is to provide an instrumentation panel for each remote control vehicle in view of the camera for displaying the various parameters monitored to a user at a remote control station.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
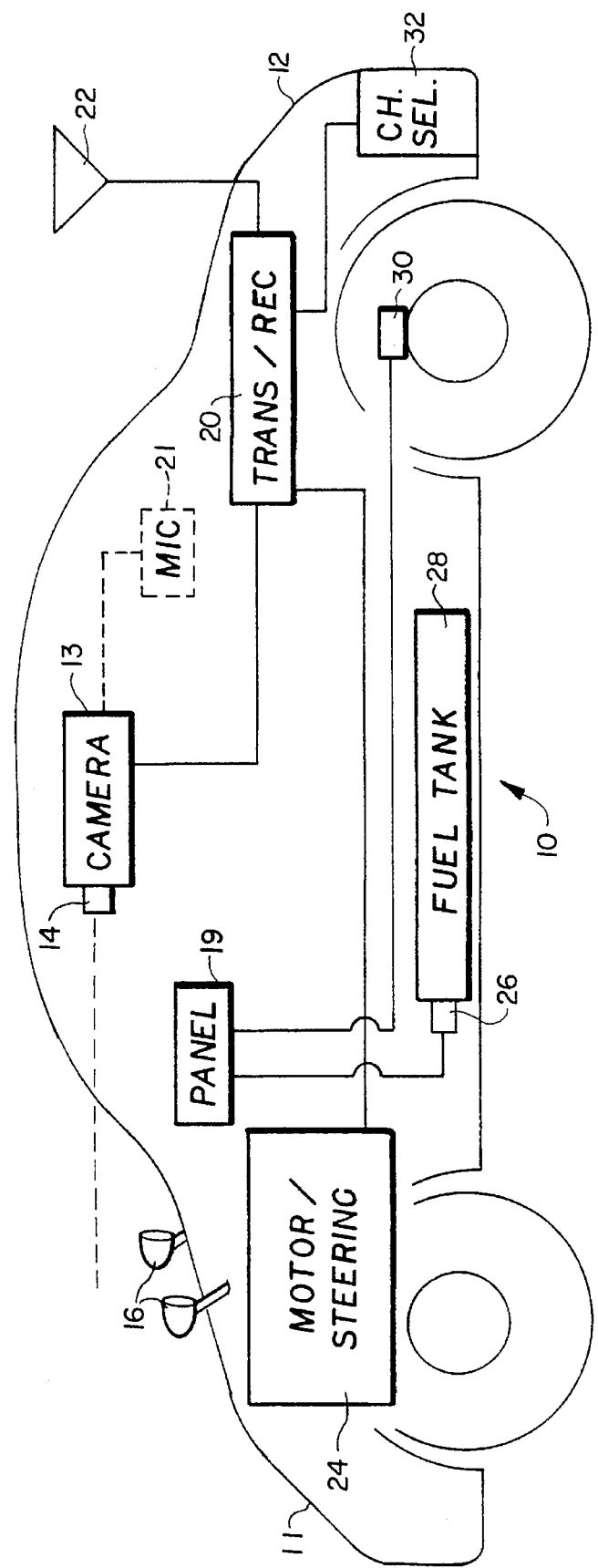
FIG. 1 is a block diagram of a remote controlled vehicle of the present invention.

The vehicle remote control system of the present invention includes a plurality of vehicles and remote control stations. As illustrated in FIG. 1., a remote controlled car 10 has a front end 11 and a back end 12. The car 10 of the present invention includes a camera 13 having a lens 14 with a field of view toward the front end 11 so as to provide a view of a forward path of travel of the car 10. A pair of side rear view mirrors 16 are connected to the front end 11, one on the right side thereof and the other on the left side thereof. The mirrors 16 are located within the field of view of the lens 14. The camera 13 produces a video signal which is sent to transmitter and receiver circuitry 20 so as to be broadcast by an antenna arrangement 22 to a remote control station. In this manner, the images of objects in front of the vehicle 10 and in back of the vehicle 10 are transmitted to the user. An optional microphone 21 connected to the camera 13 may be used to allow sound to be transmitted with the video signal.

An instrumentation panel 19 is also located within the field of view of the lens 14. A fuel gauge 26 located within a fuel tank 28 produces a gas level indication signal in accordance with the amount of fuel which is located within the fuel tank 28. A speed indicator 30 provides a speed indication signal indicative of the magnitude of the speed of vehicle 10. Both the speed indication signal and the gas level indication signal are provided to an instrumentation panel 19. With the panel 19 also being located within the field of view of lens 14, an indication of the amount of fuel left and the speed of car 10 is provided to the user at the remote control station along with the view of any objects either directly in front of car 10, or directly behind car 10, or to either side of car 10.

Transmitter and receiver circuitry 20 further includes circuitry for receiving a selective remote control signal which control the motor and steering mechanism 24 of the vehicle 10. In the preferred embodiment the selective remote control signal is received by a separate antenna of the antenna arrangement 22. As stated above, the vehicle remote control system includes at least one, and preferably a plurality, of vehicles. As illustrated in FIG. 1, each of the vehicles include a channel selector 32. Each channel between a remote controlled vehicle and a remote control station includes a unique video broadcast frequency different from the other channels and a selective remote control signal different from other remote control signal located within other channels, also different from the other remote control channels. The channel selector 32 allows the user to select which channel the remote controlled vehicle 10 operates off of. If the user selects the same channel at his or her remote control station as is selected on the vehicle 10, the user can remotely control that vehicle 10 from that remote control station as well as view objects monitored by the camera 13 of that same vehicle 10.

Figure 2:
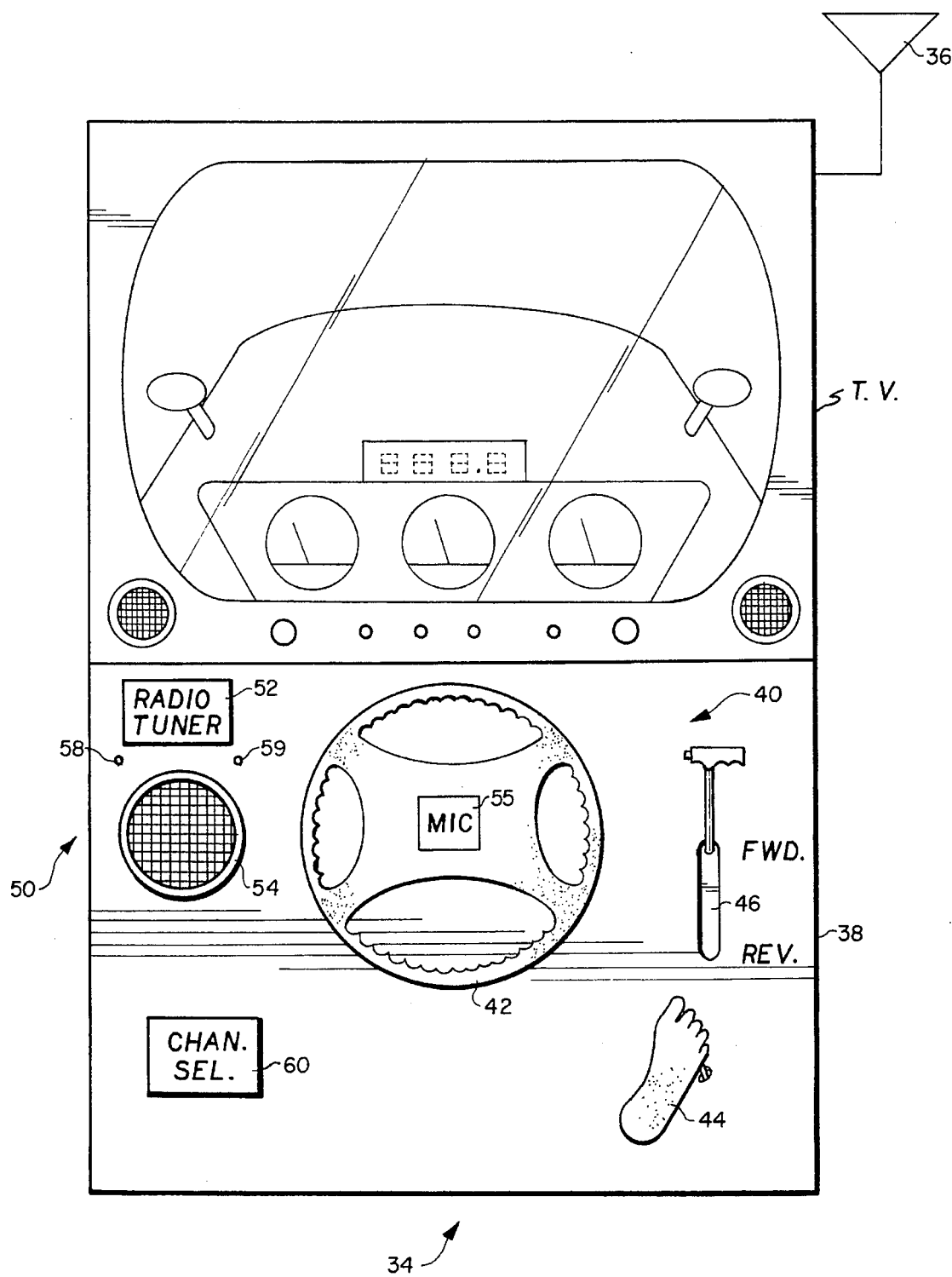
FIG. 2 is a front view of a remote control station of the present invention.

As illustrated in FIG. 2, a remote control station 34 includes an antenna arrangement 36 for receiving the video signal and transmitting the selective remote control vehicle. The antenna arrangement 36 includes a plurality of antennas, each one performing a separate function as will be discussed below. Each remote control station 34 also includes a commercially available television set connected to the remote control unit of the present invention. The remote control unit includes various user inputs 40 for controlling the motor and steering mechanism 24. For controlling the direction of travel for the car 10, the user inputs 40 include a steering wheel 42. An accelerator pedal 44 is provided for allowing the user to control the speed of the car 10, which increases the farther down the accelerator pedal 44 is pushed. Further, user inputs 40 include a switch 46 for setting the path of travel of car 10 in either the forward or reverse direction.

Figure 3:
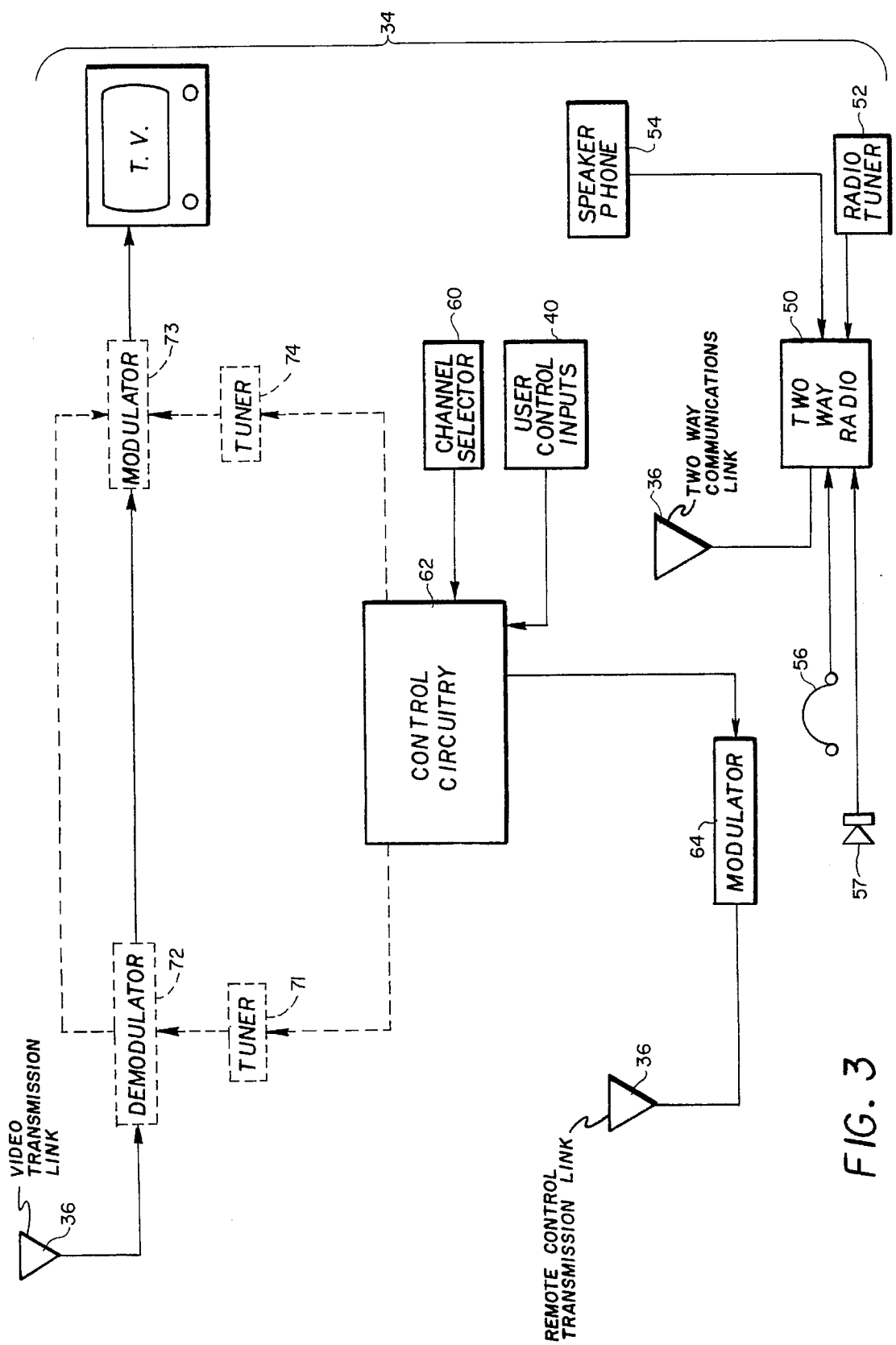
FIG. 3 is a block diagram of the remote control station.

The remote control unit further includes a two-way radio unit 50 which may be tuned via a radio tuner 52. The two-way radio allows a user from one remote control station 34 to communicate with another user at a different remote control station 34. The radio tuner 52 is manually adjustable by the user to a predetermined frequency. The radio unit 50 includes voice activated speakerphone circuitry. A speakerphone speaker 54 allows a user to hear another user speaking into a condenser microphone 55. The radio unit 50 allows a user to transmit when he or she speaks into the microphone 55 after no other transmissions are detected. As illustrated in FIG. 3, a headphone set 56 and an external microphone 57 may be used by the user. The headset 56 would plug into a earphone jack 58 (see FIG. 2) thereby intercepting the signal which would be sent to the speaker 54. Likewise, once the microphone 57 is inserted into a microphone jack 59, the voice of the user transmitted by the radio unit 50 is picked up by the external microphone 57 instead of the built in condenser microphone 55.

As illustrated in FIGS. 2 and 3, a channel selector 60 allows a user to select a channel on which the remote control station 34 operates. As stated above, each channel used within the vehicle remote control system of the present invention includes a different video signal and remote control signal so that a remote control station 34 receives a video signal from and controls only one vehicle 10 within the system. Control circuitry 62 converts the user generated commands from user inputs 40 into a remote control signal having a selective format as determined by channel selector 60.

Each remote control signal of the various channels within the preferred embodiment are modulated on the same carrier frequency and include digital information identifying the channel as well as the remote control operations to be performed. Once control circuitry converts the user inputs into the remote control signal for the selected channel, that remote control signal is modulated by modulator circuitry 64 and is then sent to a remote control transmission link, which is an antenna of the antenna arrangement 36 designed for transmitting radio frequency signals.

In the preferred embodiment, each vehicle remote control station 34 includes a video transmission link with the remote controlled vehicle 10 which is set on the same channel as the television set and the channel selector 60. Therefore, the channel selector 32 of each remote controlled vehicle 10 selects a channel format for transmission of the video signal using the national standard code (NTSC) format for televisions used in the United States of America so that any commercially available television may be used as the monitor for the remote control station 34.

Alternatively, a video signal format different from the NTSC formats may be used. In this instance, control circuitry 62 would control tuner 71 to establish the video signal channel for receiving and recovering the video signal via demodulator circuitry 72 which was modulated and transmitted on the same channel selected by the channel selector 60. Once the video signal is recovered by the demodulator 72, the recovered video signal is sent to modulator circuitry 73. Modulator 73 modulates the recovered video signal on a channel having an NTSC format and sends this modulated signal to the television set. Tuner 74 establishes which NTSC channel format modulator 73 uses. Control circuitry 62 controls tuner 74 in accordance with channel selected by the user. The television set must be set to that channel to display the video signal. If an audio signal was included in the video signal transmitted by the vehicle 10, it is separated by demodulator 72 and recombined by modulator 73 before being sent to the television set.

Figure 4:
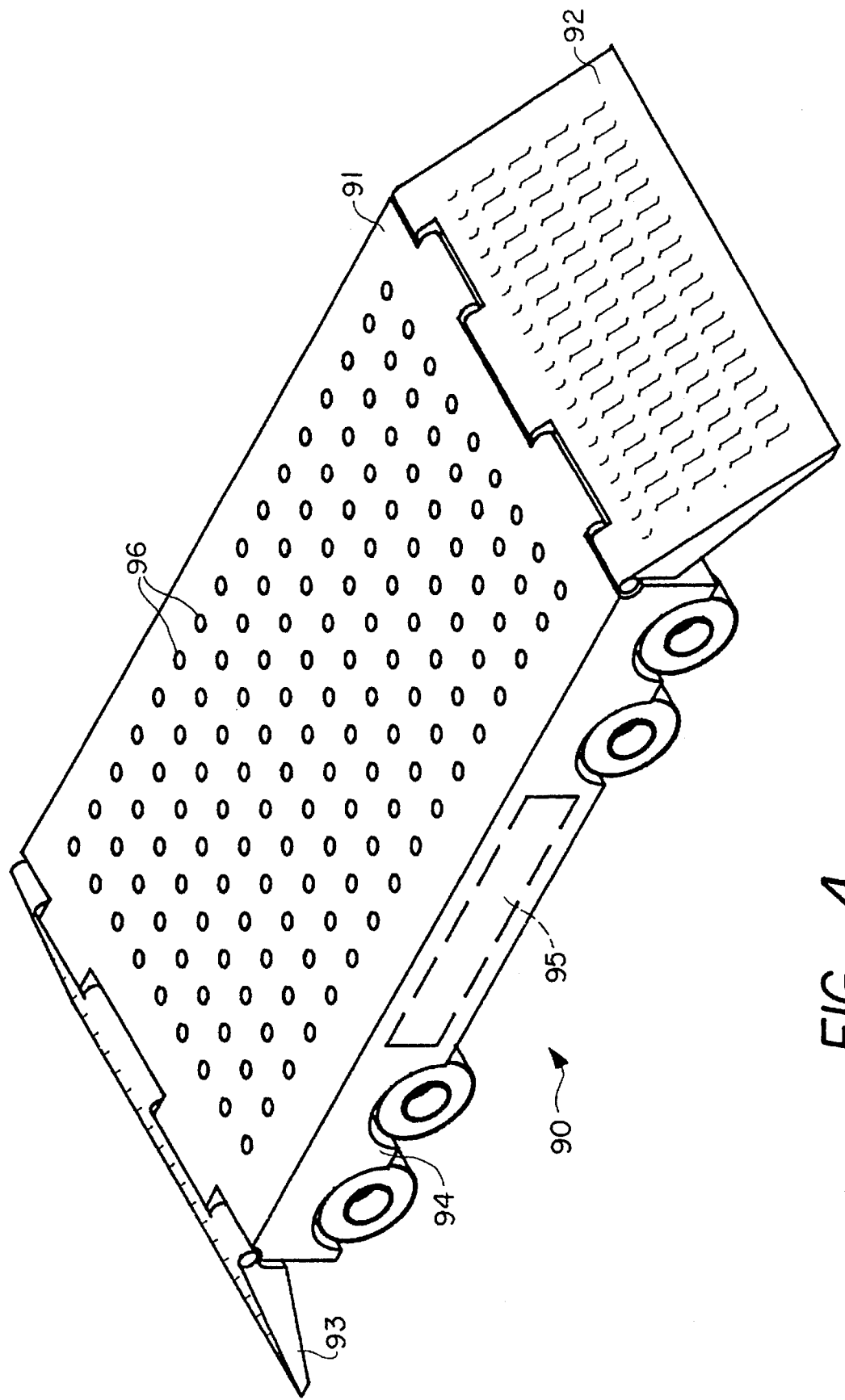
FIG. 4 is a side perspective view of the cooling platform used to hold the remote controlled vehicles of the present invention.

As illustrated in FIG. 4, a conditioning platform for cars not in immediate use is provided, which either cools or heats a car, depending on climate, ordinarily. In most cases, a platform 90 is used to cool the vehicles 10 not in immediate use. During operation of the vehicles 10, the motors get hot. Between races, the vehicles 10 may be placed on the cooling platform 90 to allow the motors to cool. Each cooling platform includes a flat bed 91. At the back end of the flat bed 91 is a back gate 92 and at the front end of the bed 91 is a front gate 93. The gates 92 and 93 are pivotally attached to the platform 90. An enclosed bottom portion 94 located below the flat bed 91 includes an air conditioning unit 95 to cool the air within the enclosed portion 94 and to pump the air out the plurality of air outlets 96 located on the flat bed 91. Thus, any vehicles 10 located on the flat bed 91 are cooled by the cold air located within the enclosed bottom portion 94. Alternatively, unit 95 may be a heating unit or include a heat generating output as well as a cooling output. Of course, in colder climates, a heating output may be necessary to keep cars warm that are not being used immediately.

Accordingly, it is to be understood that unit 95 is an air generating unit that may provide cool air, heated air, or both heated and cooled air, selectively, depending on need.

Furthermore, a vehicle platform control arm in the configuration of a wagon handle, for example, can be provided for controlled movement of the platform from place to place. Of course, the appropriate gate, in this case, gate 93, will be raised; a single pair of wheels could be provided on a pivoting axle at this end of the platform, and the entire platform then moved from place to place in wagon fashion, much the same as baggage wagons at major airports are moved from place to place. Thus, platform 90 is conveniently further employed to store vehicles and can also be used to transport vehicles to and from storage and the raceway.

While a gasoline car 10 is illustrated in the preferred embodiment, other drive mechanisms may be used. For example, car 10 may be an electric car and be powered by a battery. In this case, a battery power level indicator would be used in place of fuel gauge 26. Further, the instrument panel 19 may provide more information, such as elapsed time from initial movement of the car 10, the temperature of the motor, etc. Other sensors would have to be used to sense these parameters. Other modifications to the preferred embodiment may include the use of vehicles other than cars, such as remote controlled planes, helicopters, trains, boats, or other vehicles.

It is to be understood that the present invention is not limited to the sole embodiment described above, but encompasses any and all embodiments within the scope of the following claims.

I claim:

1. A vehicle system comprising:
   at least one remote control unit;
   at least one remote controlled vehicle including:
     a remote control receiver for receiving a selective remote control signal sent by a user from one remote control unit,
     a drive mechanism for propelling said vehicle in a direction and speed in accordance with said received selective remote control signal,
     a camera for producing a video signal in accordance with a video image viewed by a lens of said camera, said lens having a field of view in a direction toward a forward path of travel of said remote controlled vehicle,
     a video signal transmitter for modulating said video signal and transmitting said modulated video signal to said one remote control unit,
     a vehicle monitoring system for monitoring various parameters of said vehicle, and
     an instrumentation display for displaying information indicative of said various monitored parameters, said instrumentation display being within the field of view of said lens;
   wherein said at least one remote control unit including:
     a video transmission link for receiving said transmitted modulated video signal,
     user control inputs for producing user control signals in response to user inputs,
     controller means for converting said user control signals into said selective remote control signal,
     a remote control modulator for modulating said selective remote control signal, and
     a remote control transmission link connected to said remote control modulator for transmitting said modulated selective remote control signal to said remote controlled vehicle; and
   a vehicle conditioning platform including,
     a flat bed for receiving said remote controlled vehicle,
     a back gate pivotally attached to a back portion of said conditioning platform for allowing said vehicle to roll up onto said flat bed when said back gate is lowered,
     a front gate pivotally attached to a front portion of said conditioning platform for allowing said vehicle to roll of said flat bed when said front gate is lowered,
     an enclosed bottom portion located below said flat bed
     an air generating unit within said enclosed bottom portion, and
     a plurality of air outlet holes located on said flat bed for allowing air generated from said air generating unit within said bottom portion to exit through said holes so as to condition said remote controlled vehicle located on said flat bed.

2. A vehicle system as claimed in claim 1, wherein said video signal transmitter is configured to modulate said video signal in a format as outlined within a national standard television code.

3. A vehicle system as claimed in claim 2, wherein said camera further includes a built in microphone for combining an audio signal with said video signal.

4. A vehicle system as claimed in claim 1, wherein said vehicle includes at least one rear view mirror located within the field of view of said lens.

5. A vehicle system as claimed in claim 1, wherein said vehicle includes a channel selector for selecting one of a plurality of channels for operating said remote controlled vehicle, each channel including a predetermined and unique video broadcast frequency at which said video signal is modulated by said video signal transmitter.

6. A vehicle system as claimed in claim 5, wherein said each channel further includes a predetermined and unique remote control signal for operating said remote controlled vehicle.

7. A vehicle system as claimed in claim 1, wherein said at least one remote control unit further includes:
   video signal demodulation circuitry connected to said video transmission link for recovering said transmitted modulated video signal, and
   video signal modulation circuitry connected to said video signal demodulation circuitry for modulating said recovered video signal output into a video format within a national television standard code.

8. A vehicle system as claimed in claim 7, wherein said remote control unit further includes:
   a demodulation tuner connected to said video signal demodulation circuitry for setting a carrier center frequency at which said video signal demodulation circuitry recovers said transmitted modulated video signal,
   channel selector circuitry having a plurality of settings for allowing the user to select one of a plurality of channels, the selected channel being used to operate said remote controlled vehicle, and
   control circuitry including means for controlling said demodulation turner in such a way as to select said carrier center frequency from a plurality of carrier center frequencies in accordance with the setting of said channel selector circuitry.

9. A vehicle system as claimed in claim 8, wherein said at least one remote control unit further includes a remote control tuner connected to said remote control modulator for selecting a format of modulation for said remote control signal from a plurality of formats of modulation, wherein said remote control receiver of said remote controlled vehicle only receives a remote control signal of a particular one of said plurality of formats of modulation.

10. A vehicle system as claimed in claim 1, further comprising a plurality of remote controlled vehicles and a corresponding plurality of remote control units, each of said remote control units further including a two way radio for communicating between said remote control units.

11. A vehicle system as claimed in claim 1, wherein said air generating unit is an air conditioner for outputting cooled air.

12. A vehicle system as claimed in claim 1, wherein said air generating unit is a heater for outputting heated air.

13. A vehicle system as claimed in claim 1, wherein said air generating unit is configured to output cooled and heated air, selectively.

14. A vehicle system as claimed in claim 1, further comprising a plurality of remote controlled vehicles and a corresponding plurality of remote control units.

* * * * *